United States Patent [19]

Wolfe

[11] Patent Number: 5,266,616
[45] Date of Patent: Nov. 30, 1993

[54] POLYOLEFIN RESIN FORMULATION USING ORGANIC PIGMENTS

[75] Inventor: Al R. Wolfe, Bartlesville, Okla.

[73] Assignee: Phillips Petroleum Company, Bartlesville, Okla.

[21] Appl. No.: 729,516

[22] Filed: Jul. 12, 1991

[51] Int. Cl.$^5$ ............... C08K 5/524; C08K 5/3492; C08K 5/3435; C08K 5/3417

[52] U.S. Cl. ............................ 524/94; 524/100; 524/291

[58] Field of Search .............. 524/94, 100; 548/460

[56] References Cited

U.S. PATENT DOCUMENTS

| | | | |
|---|---|---|---|
| 2,973,358 | 2/1961 | Pugin | 260/240 |
| 3,758,497 | 9/1973 | Pugin et al. | 260/325 |
| 4,158,661 | 6/1979 | Babler | 548/460 |
| 4,226,901 | 10/1980 | Sugiura et al. | 525/162 |
| 4,371,467 | 2/1983 | Ando et al. | 549/460 |
| 4,810,733 | 3/1989 | Sakuma et al. | 524/400 |
| 4,865,650 | 9/1989 | Crone et al. | 106/494 |
| 4,892,899 | 1/1990 | Jaffe et al. | 524/83 |
| 5,030,734 | 7/1991 | Babler | 548/460 |
| 5,102,611 | 4/1992 | Wolfe et al. | 264/568 |

FOREIGN PATENT DOCUMENTS

| | | |
|---|---|---|
| 51-5349 | 1/1976 | Japan . |
| 57-149341 | 9/1982 | Japan . |
| 57-155242 | 9/1982 | Japan . |

OTHER PUBLICATIONS

Two Sheets containing Ciba-Geigy technical information concerning IRGAZIN 2GLTE and 3RLTN pigments, Jul. 12, 1991.

Ciba-Geigy technical and sales information: Antioxidants for Polyolefins; Light Stabilizers for Polyolefins; Chimassorb 944 FL; and Chimassorb 119 FL. (1990).

M. Ahmed, Coloring of Plastics, Van Nostrand Reinhold Co. (1979), Ch. 3 and 5.

Modern Plastics Encyclopedia 90, Mid-Oct. Issue, pp. 168 and 171, 648-660.

*Primary Examiner*—Veronica P. Hoke
*Attorney, Agent, or Firm*—Gary L. Haag

[57] ABSTRACT

This invention concerns a resin formulation for an organically pigment polyolefin resin suitable for tubing and pipe service. The resin formulation is comprised of ethylene polymers, a UV stabilizer, an antioxidant, and a tetrachloroisoindolinone pigment. The resulting resin possesses excellent heat stability and color fastness. The dilute concentration of organic pigment in the inventive formulation presents a cost acceptable alternative to the widely- and routinely-used cadmium- and lead-bearing dyes and pigments which are classified as toxic chemicals under SARA Title III Section 313.

18 Claims, No Drawings

POLYOLEFIN RESIN FORMULATION USING ORGANIC PIGMENTS

BACKGROUND OF THE INVENTION

This invention relates to a pigmented polyolefin resin suitable for tubing and pipe service.

Although numerous dyes and pigmenting agents exist for coloring polyolefin resins, many of these agents have limited thermal stability, color fastness and exhibit compatibility problems with the base resin and various resin additives which may include antioxidants and UV stabilizers. Historically, the more stable dyes and pigments have been inorganic in nature and many contain heavy metals. For applications wherein red, orange and yellow coloring is desired, cadmium and lead-bearing dyes and pigments are routinely used. These dyes and pigments are relatively inexpensive and exhibit excellent heat stability and color fastness characteristics. However the presence of cadmium and lead in these pigments and dyes cause them to be classified as toxic chemicals under SARA Title III Section 313. Because of this, special precautions are required to minimize personnel exposure during the formulation of said dye/pigment-bearing resins and upon disposal of the resin-bearing material. These precautions are both time- and cost-intensive.

SUMMARY OF THE INVENTION

It is an object of this invention to formulate an organically pigmented ethylene polymer which possesses excellent thermal stability and color fastness.

A further object of this invention is to provide a resin which possesses significant resistance to degradation by UV radiation.

Yet a further object of this invention is to provide a resin formulation which possesses properties suitable for tubing and pipe extrusion.

Still a further object of this invention is to provide an extruded ethylene polymer product which possesses excellent smoothness characteristics.

Still yet a further object of this invention is to provide an organically pigmented high molecular weight copolymer of ethylene.

In accordance with this invention, a resin formulation is provided comprising an ethylene polymer, a UV light stabilizer, an antioxidant, and an isoindolinone organic pigment.

In another embodiment of this invention, pipe, tubing and associated fittings are manufactured from resin prepared from said formulation. Even when a vacuum sizing process is used for extrusion, the internal non-sized surface possesses excellent smoothness characteristics.

DETAILED DESCRIPTION OF THE INVENTION

The toxicity of heavy metals such as lead and cadmium and the resulting effects on the human body have been known for many years. Nonetheless, the use of lead and cadmium-bearing pigments for the coloring of thermoplastics, particularly orange and yellow gas pipe and fittings, has become the industrial norm. Compared to other alternatives, these pigments are relatively inexpensive and a track record of favorable experience in resin formulation and pipe production has resulted. Until this invention, the apparent lack of viable alternatives favored their continued use. However where such pigments are used, the potential for human exposure exists during manufacture and product disposal, particularly if disposal is by incineration. Furthermore, lead- and cadmium-bearing pigments are classified as toxic chemicals under SARA Title III Section 313 and this in turn brings about the added complexities of complying with government regulations.

Organic pigments present an alternative to the use of heavy metal-bearing inorganic pigments. However prior to the current invention, numerous questions and uncertanties remained unresolved regarding the processing and formulation of an organically pigmented polyolefin resin. Organic pigments are generally more expensive, less thermally stable, and present unique processing problems. These processing problems included questions concerning the thermal stability of the pigment at melt temperatures, the compatibility of the base resin with various additives and residues which may be present in the melt prior to extrusion, the rheological properties of the melt and any associated effects on the extrusion or molding process, the degree of warpage or shrinkage upon processing, the color fastness and the weathering characteristics of the product, and the mechanical and physical properties of the finished product. All of these problems are more acute when using the type of high molecular weight resins required for high performance pipe. Unlike a dye which dissolves in the resin, pigments are small, intensely colored, discrete particles which are dispersed throughout the solid matrix. Therefore, the physical properties of the finished product will be dependent on the surface interactions between the pigment and the solidified resin and the associated effects of the various additives.

Historically, organic pigment use at any temperature in non-specialty resins has been disfavored because of cost. On a color equivalent basis, inorganic pigments are much cheaper. A novel aspect of the resin formulation of this invention is the ability to impart significant color to the finished product and at the same time, significantly reduce the amount of pigment required. At the preferred concentration of 0.075 wt %, the selected organic pigments have an acceptable cost. Resin formulation has also been simplified by the lack of an opacifying agent such as titanium oxide (i.e., the product is semi-transparent). However because of the dilute pigment concentration and the transparent nature of the product, color integrity can only be maintained if the pigment, the base polyolefin resin, and the various additives do not discolor during resin formulation, extrusion and molding, and subsequent weathering and aging. These factors place significant restraints on the formulation of a successful resin.

The resin formulation preferably consists essentially of the base ethylene polymer resin, one or more UV stabilizers, one or more antioxidants, and one or more organic tetrachloroisoindolinone pigments. "Ethylene polymer" as used herein refers to both ethylene homopolymer and copolymer which is produced by copolymerizing ethylene with one or more higher alpha-olefin comonomers. Preferably, the alpha-olefin contains about 3 to about 8 carbon atoms. The comonomer is normally present in small percentage, i.e., an amount to maintain a polymer density of greater than about 0.926 g/cc. Usually, up to about 5 mole percent comonomer is present in the total monomer mixture. Examples of ethylene comonomers include, but are not limited to propylene, 1-butene, 1-hexene, and mixtures thereof. In terms of incorporated comonomer, the percentage of comonomer based on the total weight of polymer is generally about 0.1 to 5 and preferably 0.4 to 1 wt %. The ethylene polymer component of the invention can be produced by any method known in the art. One method of polyethylene production uses a silica-supported chromium-oxide catalyst system, such as described in U.S. Pat. No. 2,825,721 and U.S. Pat. No. 2,951,816 by Hogan and Banks, which are herein incorporated by reference. Another method of ethylene polymer production uses a transition metal catalyst and relatively low temperatures and relatively low pressures.

For the preferred copolymers of ethylene, a density of about 0.926 to 0.955 g/cc and a melt index of about 0.1 to 1 g/10 min is preferred. When using the most preferred comonomer, hexene, the preferred density and melt index range is about 0.926 to 0.955 g/cc and about 0.1 to 0.5. For the extrusion of gas pipe and tubing and molding of associated fittings, the most preferred resin density is about 0.934 to 0.946 and a melt index of 0.10 to 0.20. All melt index values were obtained at Condition 190/2.16 using ASTM D 1238-89 where 190 is the test temperature in degrees Centigrade and 2.16 is the total loading in kilograms.

A key aspect of this resin formulation is the use of an organic pigment as a coloring agent. In accordance with this invention, effective coloring of the polyolefin resin is possible with low concentrations of tetrachloroisoindolinone (<1.0 wt %) and the product possesses the desired color fastness and thermal stability. Tetrachloroisoindolinones used in this invention are represented by the structural formula

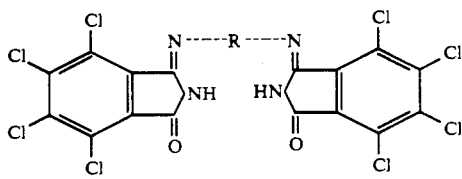

where R is a hydrocarbon group. The preferred hydrocarbon groups (R) in the preceeding formulation for the preferred yellow pigments are represented by

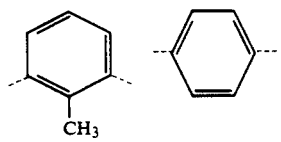

When desiring a yellow product, the former representation which contains the methyl group (hereinafter referred to as Pigment #1) is preferred. When desiring an orange-tinted yellow, the latter (no methyl group) is preferred (hereinafter Pigment #2). Mixtures of the two pigments provide intermediate colors. The desired concentration of pigment is that amount effective to give the desired degree of color. Preferably no agent is added to increase opacity. Because of the dilute concentrations of organic pigment and the lack of an opacifying agent, the final product is semi-transparent. For this invention, a concentration as low as 0.05 wt % provides sufficient tinting for the color coding of pipe, tubing, and associated fittings. Therefore a concentration range of 0.05 to 1.0 wt % is preferred. To insure adequate color to mask subtle changes in resin color from long term weathering and to minimize pigment costs, the most preferred concentration range is 0.05 to 0.10 wt %. (Unless otherwise noted, all weight percentages herein are based on weight of final product.)

UV stabilizers are added to the base resin in an amount effective to negate UV degradation from weathering over the anticipated exposure life of the product. The preferred UV stabilizers are hindered amine light stabilizers which apparently function by eliminating free radicals formed by the interaction of UV radiation with the resin and which if left unchecked, would cause the polymer to break down and the product to degrade. The amount of UV stabilizer will be dependent upon the anticipated use of the product. For products such as gas tubing and pipe which will ultimately be buried, sufficient UV stabilizer is required only to negate degradation during surface storage of the product prior to actual installation. However when the product is to be exposed to UV radiation from the sun on a daily basis, sufficient UV stabilizer must be added to prevent degradation over the anticipated life cycle of the product. Although estimates of the amount of UV stabilizer required to prevent degradation for a given application are possible, tests on the actual resin with accelerated weathering devices are recommended. These devices approximate the weathering effects of sunlight on an accelerated basis and thereby enable a more accurate estimate of the amount of UV stabilizer required in a given resin containing given additives. As previously noted, the amount of UV stabilizer will be dependent upon the application and nominally, will be the amount effective to meet the designated requirements. As an example, ASTM D2513 Thermoplastic Gas Pressure Pipe Specification requires that gas pipe maintain specified pipe properties for two years so as to cover a reasonable time for above ground storage. Based on these requirements, a nominal hindered amine or other UV stabilizer concentration of about 0.125 wt % is preferred. In the most preferred formulation, the weathering life is increased to 3 to 4 years by a nominal stabilizer concentration of about 0.175 wt %. Tests conducted at concentrations up to 0.375 wt % indicated little additional benefit is derived from concentrations greater than about 0.25 wt % stabilizer. Preferred UV hindered amine stabilizers contain a functional group represented by

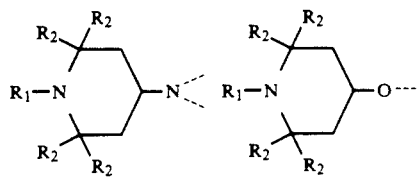

where $R_1$ is a methyl group or hydrogen and $R_2$ is a methyl group. Specifically preferred stabilizers are UV Stabilizer #1 and #2 represented by:

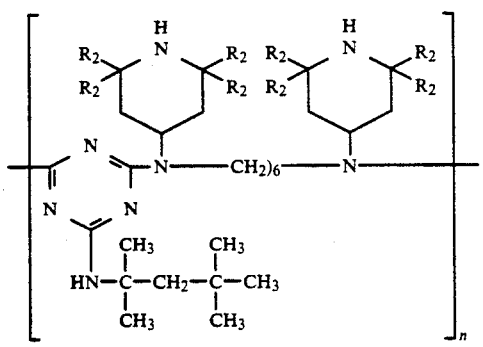

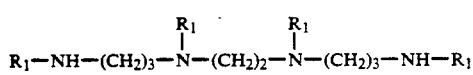

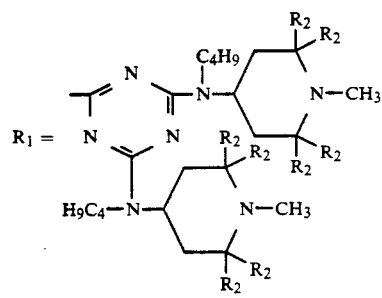

where $R_2$ is a methyl group. Respective chemical names are: N,N'-bis(2,2,6,6-tetramethyl-4-piperidinyl)-1,6-hexanediamine, polymer with 2,4,6-trichloro-1,3,5-triazine and 2,4,4-trimethyl-1,2-pentanamine and 1,3,5-triazine-2,4,6-triamine,N,N'''-[1,2-ethanediylbis[[[4,6-bis[butyl(1,2,2,-6,6-pentamethyl-4-piperidinyl)amino]-1,3,5-triazine-2-yl]imino]-3,1propanediy-1]]-bis[N',N''-dibutyl-N',N'''-bis(1,2,2,6,6-pentamethyl-4-piperidinyl)-.

As shown in Example 2, studies conducted at elevated temperatures indicated UV Stabilizer #2 to be the preferred hindered amine light stabilizer at dilute pigment concentrations. Although no degradation of the "physical" properties of the polyolefin was observed when UV Stabilizer #1 was tested at an elevated temperature for an extended time period, the product was observed to discolor from yellow to brown. Although not wishing to be bound by theory, the discoloring is thought to result from either the specific UV stabilizer or an interaction between this stabilizer and the antioxidant. Therefore, this hindered amine light stabilizer was considered to be inferior to UV Stabilizer #2 which did not exhibit discoloring at similar test conditions.

Organic materials such as ethylene polymers can react with oxygen via a process called autoxidation. Autoxidation can be initiated by heat, light, mechanical stress, catalyst residues, or reaction with impurities to form alkyl radicals. These radicals can then in turn react and degrade the polymer. This form of degradation can be significantly reduced by the addition of antioxidants to the polyolefin. Antioxidants are often broken into two catagories, primary and secondary antioxidants. The primary antioxidants are generally stearically hindered phenols. A commonly used and preferred antioxidant is 2,6-di-t-butyl-4-methylphenol which has the structural form represented by

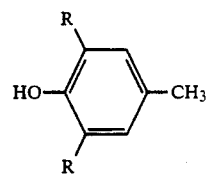

wherein each R is a tertiary butyl group. Many other preferred primary antioxidants are functionally equivalent in that the preceeding structure is attached to a hydrocarbon backbone through the methyl group. Hindered phenols of this structure are preferred because of commercial availability and excellent performance in polyolefins. Most preferred is tetrakis[methylene(3,5-di-tert-butyl-4-hydroxy-hydrocinnamate)]methane, hereinafter referred to as Primary Antioxidant, represented by the structural formula

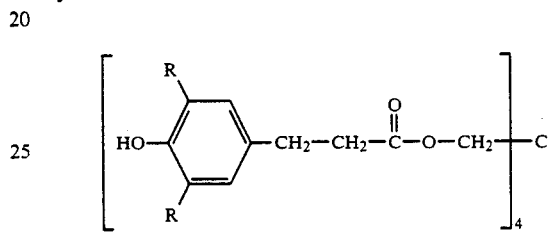

wherein each R is a tertiary butyl group. This primary antioxidant is most preferred because of its commercial availability, low toxicity and excellent performance in ethylene polymers.

The secondary antioxidants are particularly effective at elevated temperatures and protect both the polymer and the primary antioxidants. Secondary antioxidants are sometimes referred to as process stabilizers. A second beneficial aspect of using both primary and secondary antioxidants is a synergistic effect whereby the performance of the two additives in combination is greater than the additive contribution of each component when present alone. Generally, secondary antioxidants are phosphites and thioesters. The preferred antioxidant is a phosphite represented by

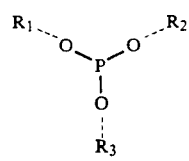

when at least one of the R groups is represented by a functional group of the form

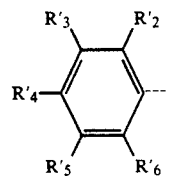

where at least one of the R' groups is a tertiary butyl group and the remaining R' groups are either tertiary butyls or hydrogens or mixtures thereof. For the most preferred secondary antioxidant, the $R_2'$ and $R_4'$ groups are tertiary butyl and all other R' groups are hydrogens and $R_1$, $R_2$ and $R_3$ are of this functional form. This compound is referred to as tris(2,4-di-tert-butylphenyl)-phosphite (hereinafter Secondary Antioxidant). As will be discussed later, the phosphites are preferred as antioxidants because of their favorable affect on surface smoothness when present in appropriate concentrations. Secondary Antioxidant is most preferred because of its hydrolytic stability, favorable effect on the oxidative induction time (OIT) and minor effect on melt index (see Table I).

The amount of antioxidant will be dependent upon the severity of the environment for a given application. An antioxidant concentration effective to prevent autoxidation under the envisioned usage conditions and life span of the product should be added to the resin. Generally, a net antioxidant (primary and secondary) and UV stabilizer (generally a hindered amine) concentration in the resin of about 0.325 to 0.625 wt % is preferred. UV stabilizers also function as antioxidants because of their free radical trapping effectiveness. Preferably, the combined concentration of primary (generally phenolic) and secondary (generally phosphitic) antioxidants should be about 0.05 to 0.50 wt %. Because of a synergistic relationship between phenolic antioxidants and phosphites, a weight ratio of about 1:1 to 1:4 phenolic antioxidant to phosphite is preferred. Table I shows that the surface properties of the finished product can be significantly improved by the addition of a phosphite additive to the resin. This factor is particularly important for the vacuum sizing of extruded pipe and tubing wherein improvements in the smoothness of the internal non-sized surface can significantly reduce the friction to fluid flow and thereby reduce the pressure drop associated with fluid flow through the pipe and tubing.

Based on the preceeding observations and restrictions, the preferred concentration of phosphite additive or other secondary antioxidants is about 0.025 to 0.25 wt % and the most preferred concentration is 0.10 to 0.20 wt %. The preferred concentration of the phenolic antioxidant or other primary antioxidants is about 0.025 to 0.25 wt %. The most preferred range 0.05 to 0.15 wt %. As previously noted, a phenolic antioxidant to phosphite ratio of about 1:1 to 1:4 is preferred because of synergistic interactions. Most preferred is a ratio of 1:1 to 1:2. Similarly as previously noted, the preferred concentration for the UV stabilizer which can also function as an antioxidant is about 0.125 to 0.25 wt % and the most preferred concentration is 0.15 to 0.20 wt %.

The following examples are provided to illustrate the practice of the invention and are not intended to limit the scope of the invention or the appended claims in any way.

EXAMPLE I

Processing Stability

A base resin consisting of ethylene/hexene copolymers possessing a density of about 0.939 g/cc and a melt index of about 0.13 g/10 min (190/2.16) determined with ASTM D 1238-89 was combined with Pigment #1 (CIBA-GEIGY 2GLTE), UV Stabilizer #1 (CIBA-GEIGY Chimassorb 944 LD), Primary Antioxidant (CIBA-GEIGY Irganox 1010), Secondary Antioxidant (CIBA-GEIGY Irgafos 168) and zirconium oxide tracer to give respective concentrations of 0.075 wt %, 0.175 wt %, 0.10 wt %, 0.20 wt % and 10 ppm by weight based on elemental zirconium. In addition, the base resin contained about 3 ppm by weight chromium and about 5 ppm by weight titanium (residuals from the polymerization catalyst). The zirconium oxide, chromium and titanium do not have a significant effect on product performance. The zirconium oxide is required and approved by the National Sanitation Foundation for water applications as a means of identifying pipe manufacturers.

Extrusion tests using the preceeding formulation showed superb heat stability. When the resin was soaked in the extruder at 450° F. for several hours, no color change was noted in the extruded product.

EXAMPLE II

Thermal Stability of Product

A product comparable to that cited in Example I (Specimen #1) and a second product (Specimen #2) consisting of the same base resin, Pigment #1, Primary Antioxidant and zirconium oxide at the same concentrations and Secondary Antioxidant and UV Stabilizer #2 (CIBA-GEIGY Chimassorb 119 FL) at respective concentrations of 0.15 wt % and 0.175 wt % were prepared. Carbon-arc weathering tests on Specimen #1 met the desired 3 to 4 year above ground storage criteria in that color fading or sample crazing was noted and therefore similar performance was inferred to Specimen #2.

When long-term hoop strength tests were conducted at about 23° and 60° C., visual appearance and physical performance for both products were acceptable. However when similar tests were conducted at 90° C., Specimen #1 darkened dramatically while other physical properties were unchanged. Specimen #2, which was formulated based on the undesirable results observed for Specimen #1, demonstrated no change in color or other physical properties at 90° C. With respect to the Specimen #1 formulation, the pigment does not appear to be discoloring but apparently the resin formulation is discoloring to such a degree as to overshadow the light shade of pigmented yellow.

EXAMPLE III

Secondary Antioxidant Effect on Pipe Smoothness

When vacuum extrusion technology is used, mechanical means for maintaining the inner smoothness of the pipe or tubing does not exist. The data presented in Table I demonstrates that when the secondary antioxidant is a phosphite such as Irgafox 168, Ultranox 626 or tris(nonylphenyl) phosphite at a concentration of about 0.10 wt % or greater in the resin, significant improvements in the smoothness of the inside surface results. The data also indicates that additional improvements in pipe smoothness are small at concentrations greater that 0.25 wt %. The increase in surface smoothness lowers the friction factor to flow and thereby reduces the pressure drop associated with fluid flow. The smoothness results presented in Table I are both qualitative, smoothness to touch, and quantitative as determined using a surface roughness gauge. Because of this performance, and the observation that Irgafox 168 possesses greater hydrolytic stability than Ultranox 626 and a lower volatility than tris(nonylphenyl)phosphite, Irgafox 168 was chosen as the preferred secondary antioxidant (Secondary Antioxidant).

TABLE I

Smoothness Characteristics of 1 inch Diameter Extruded Pipe

| Sample Additives[a,b] wt % | A | B | C | D | E | F | G | H | I |
|---|---|---|---|---|---|---|---|---|---|
| Primary Antioxidant | | | | | | | | | |
| Santonox R[c] | .05 | .05 | .05 | .05 | .05 | .05 | .05 | — | — |
| Ethanox 330[d] | .08 | .08 | .08 | .08 | .08 | .08 | .08 | — | — |
| Irganox 1010[e] | — | — | — | — | — | .10 | .10 | .10 | .20 |
| Secondary Antioxidant | | | | | | | | | |
| Irgafox 168[f] | .05 | .10 | .15 | .20 | .25 | .05 | .15 | .20 | .20 |
| Ultranox 626[g] | — | — | — | — | — | — | — | — | — |
| TNPP[h] | — | — | — | — | — | — | — | — | — |
| Pipe Properties | | | | | | | | | |
| μ-inch[i] | >200 | 99 | 79 | 73 | 75 | 140 | 69 | 71 | 71 |
| Smoothness (ID) | Rough | Smooth | Smooth | Smooth | Smooth | Rough | Smooth | Smooth | Smooth |
| Rating (1 = Best) | 5 | 3 | 2 | 1 | 1 | 4 | 2 | 1 | 1 |
| Melt Index (190/2.16)[j] g/10 min | 0.11 | 0.13 | 0.14 | 0.14 | 0.15 | 0.11 | 0.13 | 0.14 | 0.13 |
| HLMI, g/10 min[k] | 12.4 | 12.7 | 12.8 | 12.9 | 13.6 | 12.0 | 12.4 | 12.9 | 12.5 |
| OIT, minutes[l] | 32 | — | 39 | — | 44 | — | — | 51 | 115 |

| Sample Additives[a,b] wt % | J | K | L | M | N | O |
|---|---|---|---|---|---|---|
| Primary Antioxidant | | | | | | |
| Santonox R[c] | .05 | .05 | .05 | .05 | .05 | .05 |
| Ethanox 330[d] | .08 | .08 | .08 | .08 | .08 | .08 |
| Irganox 1010[e] | .10 | — | — | — | — | — |
| Secondary Antioxidant | | | | | | |
| Irgafox 168[f] | .25 | — | — | — | .05 | .05 |
| Ultranox 626[g] | — | .20 | — | — | — | — |
| TNPP[h] | — | — | .10 | .20 | — | — |
| Pipe Properties | | | | | | |
| μ-inch[i] | 66 | 61 | 74 | 67 | >200 | >200 |
| Smoothness (ID) | Smooth | Smooth | Smooth | Smooth | Rough | Rough |
| Rating (1 = Best) | 1 | 1 | 2 | 1 | 5 | 5 |
| Melt Index (190/2.16)[j] g/10 min | 0.13 | 0.14 | 0.13 | 0.13 | 0.15 | 0.12 |
| HLMI, g/10 min[k] | 12.6 | 13.0 | 12.2 | 12.3 | 14.4 | 13.1 |
| OIT, minutes[l] | — | — | — | — | 30 | 40 |

[a]Ethylene/hexane copolymer feedstock. Density = 0.938 ± 0.002 g/cc, Melt Index = 0.13 ± 0.03 at Conditions 190/2.16.
[b]All samples contained 0.15 wt % Chimassorb 944LD except N and O which contained 0.125 wt %, also referred to as UV Stabilizer #1.
[c]Monsanto tradename for 4,4'-Thiobis(6-t-butyl-3-methylphenol).
[d]Ethyl tradename for 1,3,5-Trimethyl-2,4,6-tris(3,5-di-t-butyl-4-hydroxybenzyl).
[e]CIBA-GEIGY tradename for Tetrakis[methylene(3,5-di-tert-butyl-4-hydroxy-hydrocinnamate)]methane, also referred to as Primary Antioxidant.
[f]CIBA-GEIGY tradename for Tris(2,4-di-tert-butylphenyl)phoshpite, also referred to as Secondary Antioxidant.
[g]Borg-Warner tradename for Bis(2,4-di-t-butyl)pentaerythritol diphosphite.
[h]Tris(nonylphenyl)phosphite.
[i]Determined using Pocket Surf Model EMD-1500 Surface Roughness Gauge and associated instruction manual.
[j]Melt Index determined using ASTM D 1238-89.
[k]High level melt index obtained at Conditions 190.21.6 using ASTM D 1238-89.
[l]Oxidation induction time determined using ASTM D-3895-80.

That which is claimed is:

1. A yellow organically pigmented polyolefin resin consisting essentially of:
   (a) an ethylene/hexene copolymer of about 0.934 to 0.946 g/cc density and melt index of about 0.10 to 0.20 using Condition 190/2.16,
   (b) about 0.125 to 0.25 weight percent 1,3,5-triazine-2,4,6-triamine,N,N'''-[1,2-ethanediylbis[[[4,6-bis[-butyl(1,2,2,6,6-pentamethyl-4-piperidinyl)amino]-1,3,5-triazine-2-yl]imino]-3,1propanediyl]]-bis[N',N''-dibutyl-N',N''-bis(1,2,2,6,6-pentamethyl-4-piperidinyl),
   (c) about 0.025 to 0.25 weight percent tris(2,4-di-tert-butyl phenyl) phosphite,
   (d) about 0.025 to 0.25 weight percent tetrakis(methylene (3,5-di-tert-butyl-4-hydroxyhydrocinnamate))methane, and
   (e) a tetrachloroisoindolinone organic pigment present in concentrations of 0.05 to 0.10 weight percent represented by the chemical formula

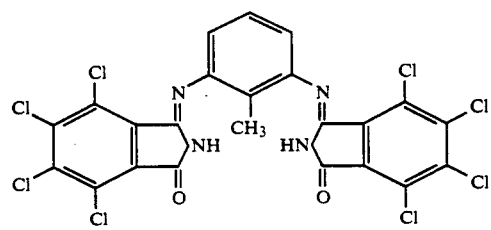

2. A yellow organically pigmented polyolefin resin consisting essentially of:
   (a) an ethylene/hexene copolymer of about 0.934 g/cc density and melt index of about 0.10 to 0.20 using Condition 190/2.16,
   (b) 0.125 to 0.25 weight percent weight percent 1,3,5-triazine-2,4,6-triamine,N,N'''-[1,2-ethanediylbis[[[4,6-bis[butyl(1,2,2,6,6-pentamethyl-4-piperidinyl)amino]-1,3,5-triazine-2-y-1]imino]3,1propanediyl]]-bis[N',N''-dibutyl-N',N'''-bis(1,2,2,6,6-pentamethyl-4-piperidinyl)-, (c) 0.10 to 0.20 weight percent tris(2,4-di-tert-butyl-phenyl) phosphite, (d) 0.05 to 0.15 weight percent tetrakis(methylene(3,5-di-tert-butyl-4-hydroxyhrocinnamate))methane, and (e) a tetrachloroisoindolinone organic pigment present in concentrations of 0.05 to 0.10 weight percent represented by the chemical formula

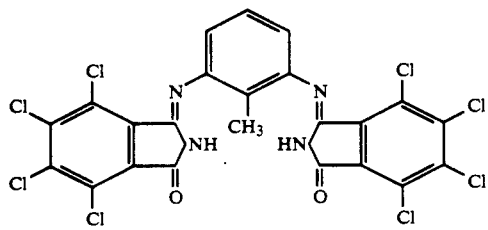

3. A yellow organically pigmented polyolefin resin consisting essentially of:

(a) an ethylene/hexene copolymer of about 0.939 g/cc density and melt index of about 0.13 using Condition 190/2.16, (b) about 0.175 weight percent N,N'bis(2,2,6,6-tetramethyl-4-piperidinyl)-1,6-hexanediamine, polymer with 2,4-6-trichloro-1,3,5-triazine and 2,4,4-trimethyl-1,2-pentanamine, (c) about 0.20 weight percent tris(2,4-di-tert-butyl-phenyl)-phosphite, (d) about 0.10 weight percent tetrakis(methylene(3,5-di-tert-butyl4-hydroxyhydrocinnamate))methane, and (e) a tetrachloroisoindolinone organic pigment present in a concentration of about 0.075 weight percent represented by the chemical formula

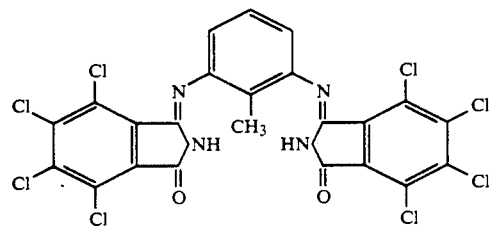

4. A yellow organically pigmented polyolefin resin consisting essentially of:

(a) an ethylene/hexene copolymer of about 0.939 g/cc density and melt index of about 0.13 using Condition 190/2.16, (b) about 0.175 weight percent 1,3,5-triazine-2,4,6-triamine,N,N'''-[1,2-ethanediylbis[[[4,6-bis[-butyl(1,2,2,6,6-pentamethyl-4-piperidinyl)amino]-1,3,5-triazine-2-yl]imino]-3,1propanediyl]]-bis[N',-N''-dibutyl-N',N''-bis(1,2,2,6,6-pentamethyl-4-piperidinyl)-, (c) about 0.15 weight percent tris(2,4-di-tert-butyl-phenyl)-phosphite, (d) about 0.10 weight percent tetrakis(methylene(3,5-di-tert-butyl4-hydroxyhydrocinnamate))methane, and (e) a tetrachloroisoindolinone organic pigment present at a concentration of about 0.075 weight percent represented by the chemical formula

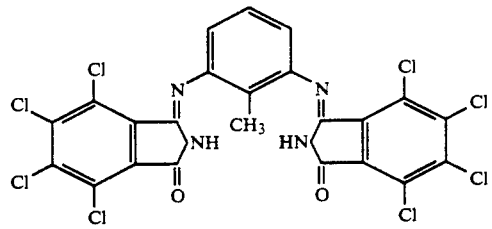

5. A yellow organically pigmented polyolefin resin consisting essentially of:

(a) an ethylene/hexene copolymer of about 0.926 to 0.955 g/cc density and having a melt index of about 0.10 to 0.5 at Condition 190/2.16, (b) about 0.125 to 0.25 weight percent hindered amine light stabilizer selected from the group consisting of N,N'-bis(2,2,6,6-tetramethyl-4-piperidinyl)-1,6-hexanediamine, polymer with 2,4,6-trichloro-1,3,5-triazine and 2,4,4-trimethyl-1,2-pentanamine or 1,3,5-triazine-2,4,6-triamine,N,N'''-[1,2-ethanediyl-bis[[[4,6-bis[butyl(1,2,2,6,6-pentamethyl-4-piperidinyl)amino]-1,3,5-triazine-2-yl]imino]-3,1 propanediyl]]-bis[N',N''-dibutyl-N',N''-bis(1,2,2,6,6-pentamethyl-4-piperidinyl)- or mixtures thereof, (c) about 0.05 to 0.50 weight percent of an antioxidant mixture of tris(2,4-di-tert-butylphenyl) phosphite and tetrakis[methylene(3,5-di-tert-butyl-4-hydroxy-hydrocinnamate)]methane wherein a ratio of the latter to the former is about 1:1 to 1:4 and (d) about 0.05 to 0.10 weight percent tetrachloroisoindolinone organic pigment selected from the group consisting of

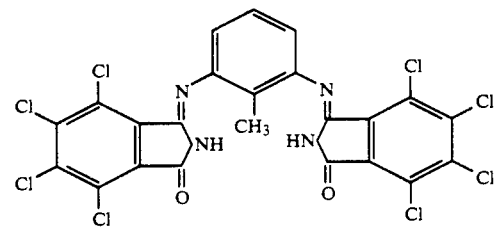

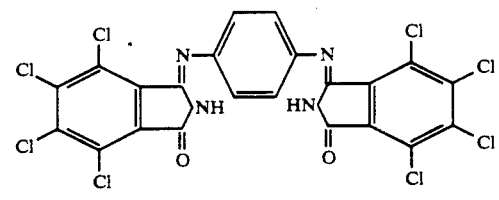

or mixtures thereof.

6. A yellow organically pigmented polyolefin resin consisting essentially of:

(a) an ethylene/hexene copolymer of about 0.934 to 0.946 g/cc density and melt index of about 0.10 to 0.20 using Condition 190/2.16, (b) about 0.125 to 0.25 weight percent 1,3,5-triazine-2,4,6-triamine,N,N'''-[1,2-ethanediylbis[[[4,6-bis[-butyl(1,2,2,6,6-pentamethyl-4-piperidinyl)amino]-1,3,5-triazine-2-yl]imino]-3,1propanediyl]]-bis[N',-N''-dibutyl-N',N''-bis(1,2,2,6,6-pentamethyl-4-piperidinyl)-, (c) about 0.10 to 0.20 weight percent tris(2,4-di-tert-butylphenyl) phosphite, (d) a combined tris(2,4-di-tert-butylphenyl) phosphite and tetrakis[methylene(3,5-di-tert-butyl-4-hydroxy-hydrocinnamate)]methane concentration of about 0.05 to 0.50 weight percent, and (e) a tetrachloroisoindolinone organic pigment present in concentrations of 0.05 to 0.10 weight percent selected from the group consisting of

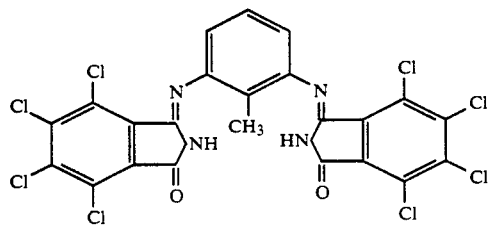

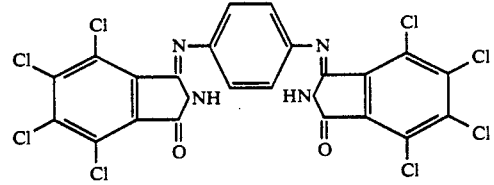

or mixtures thereof.

7. Extruded pipe prepared from the resin of claim 5.
8. Extruded pipe prepared from the resin of claim 6.
9. Extruded pipe prepared from the resin of claim 1.
10. Extruded pipe prepared from the resin of claim 2.
11. Extruded pipe prepared from the resin of claim 3.
12. Extruded pipe prepared from the resin of claim 4.
13. Extruded tubing prepared from the resin of claim 5.
14. Extruded tubing prepared from the resin of claim 6.
15. Extruded tubing prepared from the resin of claim 1.
16. Extruded tubing prepared from the resin of claim 2.
17. Extruded tubing prepared from the resin of claim 3.
18. Extruded tubing prepared from the resin of claim 4.

* * * * *